(12) United States Patent
Wu et al.

(10) Patent No.: US 10,316,450 B2
(45) Date of Patent: Jun. 11, 2019

(54) WASHING MACHINE

(71) Applicant: QINGDAO HAIER SMART TECHNOLOGY R&D CO., LTD., Qingdao (CN)

(72) Inventors: Fengling Wu, Qingdao (CN); Chunfeng Lao, Qingdao (CN); Xiang Yin, Qingdao (CN); Qiuqi Mou, Qingdao (CN); Jiangtao Zhang, Qingdao (CN)

(73) Assignee: QINGDAO HAIER SMART TECHNOLOGY R&D CO., LTD., Qingdao (CN)

( * ) Notice: Subject to any disclaimer, the term of this patent is extended or adjusted under 35 U.S.C. 154(b) by 0 days.

(21) Appl. No.: 16/060,662

(22) PCT Filed: Dec. 27, 2016

(86) PCT No.: PCT/CN2016/112440
§ 371 (c)(1),
(2) Date: Jun. 8, 2018

(87) PCT Pub. No.: WO2017/114395
PCT Pub. Date: Jun. 7, 2017

(65) Prior Publication Data
US 2018/0355539 A1   Dec. 13, 2018

(30) Foreign Application Priority Data
Dec. 28, 2015   (CN) .......................... 2015 1 1004284

(51) Int. Cl.
*D06F 37/24* (2006.01)
*D06F 23/04* (2006.01)
(Continued)

(52) U.S. Cl.
CPC .............. *D06F 37/24* (2013.01); *D06F 23/04* (2013.01); *D06F 37/12* (2013.01); *D06F 37/268* (2013.01);
(Continued)

(58) Field of Classification Search
CPC .......... D06F 23/04; D06F 37/12; D06F 37/24; D06F 37/268; D06F 37/269; D06F 37/30
See application file for complete search history.

(56) References Cited

U.S. PATENT DOCUMENTS 5,907,880 A * 6/1999 Durazzani ............... F16F 9/535
                                                    188/267
6,151,930 A * 11/2000 Carlson ................... D06F 37/20
                                                    68/12.06
(Continued)

FOREIGN PATENT DOCUMENTS

CN          1071473 A     4/1993
CN        104342878 A     2/2015
(Continued)

OTHER PUBLICATIONS

International Search Report and Written Opinion for corresponding International Application No. PCT/CN2016/112440, dated Mar. 31, 2017, 9 pages.

*Primary Examiner* — Joseph L Perrin
(74) *Attorney, Agent, or Firm* — Alston & Bird LLP (57) ABSTRACT

A washing machine comprises: an outer drum; an inner drum rotatably disposed in the outer drum; and a rotation mechanism for driving the inner drum to rotate. A rotation shaft of the rotation mechanism extends upwardly from the bottom of the outer drum to a bottom wall of the inner drum to drive the inner drum to rotate. The washing machine further comprises: at least one pair of magnets including an outer ring-shaped magnet and an inner ring-shaped magnet which is disposed at a radial inner side of the outer ring- (Continued)

shaped magnet and opposite to the outer ring-shaped magnet. The inner ring-shaped magnet is disposed on the rotation shaft, and the outer ring-shaped magnet is disposed at the bottom wall of the inner drum or the outer drum, so that a magnetic force between them can reduce a magnitude of vibration of the inner drum or the outer drum.

6 Claims, 6 Drawing Sheets (51) Int. Cl.
    *D06F 37/12*     (2006.01)
    *D06F 37/26*     (2006.01)
    *D06F 37/30*     (2006.01)
    *D06F 39/00*     (2006.01)
    *F16F 15/18*     (2006.01)

(52) U.S. Cl.
    CPC ............ *D06F 37/269* (2013.01); *D06F 37/30* (2013.01); *D06F 39/00* (2013.01); *F16F 15/18* (2013.01)

(56) References Cited

U.S. PATENT DOCUMENTS

| | | | | |
|---|---|---|---|---|
| 8,851,247 | B2* | 10/2014 | Shiga | D06F 37/20 |
| | | | | 188/267 |
| 2010/0122881 | A1* | 5/2010 | Carlson | A47C 1/03 |
| | | | | 188/267 |
| 2015/0033804 | A1* | 2/2015 | Fukui | D06F 37/22 |
| | | | | 68/140 |
| 2015/0299928 | A1* | 10/2015 | Fukui | F16C 32/0425 |
| | | | | 68/3 R |
| 2015/0315736 | A1* | 11/2015 | Fukui | D06F 37/30 |
| | | | | 68/140 |
| 2016/0312394 | A1* | 10/2016 | Wang | D06F 37/22 |

FOREIGN PATENT DOCUMENTS

| | | |
|---|---|---|
| CN | 104350196 A | 2/2015 |
| IT | 1275691 B1 | 10/1997 |

* cited by examiner

WASHING MACHINE

CROSS-REFERENCE TO RELATED APPLICATIONS

This application is a national phase entry of International Application No. PCT/CN2016/112440, filed Dec. 27, 2016, which claims priority to Chinese Application No. 201511004284.2, filed Dec. 28, 2015, the entire contents of which are incorporated herein by reference.

TECHNICAL FIELD

The present invention relates to a household appliance, in particular to a washing machine.

BACKGROUND OF THE INVENTION

In the pulsator washing machine used in our daily life, due to the eccentricity of washing articles, system resonance, etc. in the washing process, the vibration of the whole washing machine is relatively large, and at the same time, relatively larger noises would be produced, affecting the user's experience. In the prior art, the pulsator washing machines usually use a number of (generally four) suspension rods to fixedly suspend an outer drum in a casing of the washing machine, and an inner drum is rotatably arranged in the outer drum, in order to reduce the vibration during operation of the washing machine, but the effect is not obvious.

SUMMARY OF THE INVENTION

An object of the present invention is to provide a washing machine that utilizes a new technical means to achieve vibration and noise reduction in view of the above defects in the prior art.

A further object of the present invention is to provide a washing machine having a better damping effect.

In order to achieve the above object, the present invention provides a washing machine comprising an outer drum, an inner drum rotatably arranged in the outer drum, and a rotating mechanism for driving the inner drum to rotate, a rotary shaft of the rotation mechanism extending from below the outer drum upward to a bottom wall of the inner drum to drive the inner drum to rotate;

the washing machine further comprising:

at least one magnet pair each of which comprises an outer ring-shaped magnet and an inner ring-shaped magnet arranged opposite the outer ring-shaped magnet on a radially inner side of the outer ring-shaped magnet, wherein the inner ring-shaped magnet is arranged on the rotary shaft, and the outer ring-shaped magnet is arranged on the bottom wall of the inner drum or a bottom wall of the outer drum, so as to reduce the magnitude of a radial vibration of the inner drum or the outer drum by means of a magnetic force between the outer ring-shaped magnet and the inner ring-shaped magnet.

Optionally, the at least one magnet pair comprises an upper magnet pair comprising an upper outer ring-shaped magnet provided on a lower surface of the bottom wall of the inner drum, and an upper inner ring-shaped magnet arranged on the rotary shaft and opposite the upper outer ring-shaped magnet, so as to reduce the magnitude of the radial vibration of the inner drum by means of a magnetic force between the upper outer ring-shaped magnet and the upper inner ring-shaped magnet.

Optionally, the at least one magnet pair further comprises a lower magnet pair comprising: a lower outer ring-shaped magnet provided on an upper surface of the bottom wall of the outer drum, and a lower inner ring-shaped magnet arranged on the rotary shaft and opposite the lower outer ring-shaped magnet, so as to reduce the magnitude of the radial vibration of the outer drum by means of a magnetic force between the lower outer ring-shaped magnet and the lower inner ring-shaped magnet.

Optionally, the lower outer ring-shaped magnet is arranged opposite the upper outer ring-shaped magnet, an upper end face of the lower outer ring-shaped magnet has the same polarity as a lower end face of the upper outer ring-shaped magnet, so as to support the inner drum in the outer drum by means of the magnetic repulsion between the lower outer ring-shaped magnet and the upper outer ring-shaped magnet.

Optionally, the upper inner ring-shaped magnet and the upper outer ring-shaped magnet are both permanent magnetic rings; and a flange plate is arranged on the lower surface of the bottom wall of the inner drum, the flange plate has a through-hole through which the rotary shaft can pass, and the rotary shaft is connected to the flange plate in a form-fitting manner, to drive the rotation of the inner drum via the flange plate; wherein the upper outer ring-shaped magnet is fixed to a lower surface of the flange plate and surrounds the through-hole of the flange plate.

Optionally, an upper end face of the upper inner ring-shaped magnet has the same polarity as an upper end face of the upper outer ring-shaped magnet, and a lower end face of the upper inner ring-shaped magnet has the same polarity as the lower end face of the upper outer ring-shaped magnet, so as to reduce the magnitude of the radial vibration of the inner drum by means of the magnetic repulsion between the upper inner ring-shaped magnet and the upper outer ring-shaped magnet.

Optionally, the lower inner ring-shaped magnet and the lower outer ring-shaped magnet are both permanent magnetic rings; and the lower outer ring-shaped magnet is fixed to the upper surface of the bottom wall of the outer drum and surrounds a central axial hole of the bottom wall of the outer drum.

Optionally, an upper end face of the lower inner ring-shaped magnet has the same polarity as the upper end face of the lower outer ring-shaped magnet, and a lower end face of the lower inner ring-shaped magnet has the same polarity as a lower end face of the lower outer ring-shaped magnet, so as to reduce the magnitude of the radial vibration of the outer drum by means of the magnetic repulsion between the lower inner ring-shaped magnet and the lower outer ring-shaped magnet.

Optionally, the lower inner ring-shaped magnet and the lower outer ring-shaped magnet are made of the same magnet material as the upper inner ring-shaped magnet and the upper outer ring-shaped magnet;

the upper inner ring-shaped magnet and the upper outer ring-shaped magnet have the same thickness;

the upper inner ring-shaped magnet and the upper outer ring-shaped magnet are located at the same vertical height;

the lower inner ring-shaped magnet and the lower outer ring-shaped magnet have the same thickness;

the lower inner ring-shaped magnet and the lower outer ring-shaped magnet are located at the same vertical height; and projections of the lower outer ring-shaped magnet and the upper outer ring-shaped magnet coincide with each other on a horizontal plane.

Optionally, the washing machine further comprises: a casing and a plurality of damping-adjustable suspension rods for suspending the outer drum in the casing, wherein each of the damping-adjustable suspension rods comprises:

a cylinder body having a cavity defined therein for containing a magneto-rheological fluid;

an elongated suspension rod, the top end of which is provided with a top mounting seat for suspending the damping-adjustable suspension rods from a suspending seat of the casing, and the bottom end of which is inserted into the cylinder body from the upper end of the cylinder body and protrudes outwardly through the lower end of the cylinder body;

a piston fixedly fitted over the elongated suspension rod which is located in the cavity, the piston being provided with a coil for generating a magnetic field and a liquid flow passage penetrating the piston in an axial direction for circulating the magneto-rheological fluid, and a spring fitted over the elongated suspension rod between the bottom end of the elongated suspension rod and the lower end of the cylinder body, wherein the upper end of the cylinder body is formed with an upward extending positioning portion for cooperating with a shock-absorbing seat of the outer drum so that the outer drum is suspended from the damping-adjustable suspension rods under the action of the force of gravity.

When the existing washing machine performs dehydration at a high speed, the inner drum and/or the outer drum may be inclined undeterminably due to the eccentricity of the laundry, resulting in a collision between the inner drum and the outer drum or even between the outer drum and the casing. In the washing machine of the present invention, at least one magnet pair comprising an outer ring-shaped magnet and an inner ring-shaped magnet is arranged between the bottom wall of the inner drum and the bottom wall of the outer drum, the inner ring-shaped magnet is further arranged on the rotary shaft for driving the inner drum to rotate, and the outer ring-shaped magnet is arranged on the bottom wall of the inner drum or the bottom wall of the outer drum, so that when the radial vibration of the inner drum and/or the outer drum is generated due to the eccentricity of the laundry in the inner drum, the magnetic force between the inner ring-shaped magnet and its corresponding outer ring-shaped magnet is used to buffer the radial vibration of the inner drum and/or the outer drum to reduce the magnitude of the radial vibration of the inner drum and/or the outer drum, so as to effectively compensate for the radial vibration due to the eccentricity of the laundry in the inner drum, while reducing the vibration and noise, to achieve the purpose of vibration and noise reduction.

Further, in the washing machine of the present invention, an upper outer ring-shaped magnet and an upper inner ring-shaped magnet (i.e., an upper magnet pair) are respectively arranged on the lower surface of the bottom wall of the inner drum and the rotary shaft for driving the inner drum to rotate, so that when the radial vibration of the inner drum is generated due to the eccentricity of the laundry in the inner drum, the magnetic force (particularly the repulsive force) between the upper inner ring-shaped magnet and the upper outer ring-shaped magnet is used to buffer and balance the vibration of the inner drum to reduce the magnitude of the radial vibration of the inner drum, so as to effectively compensate for the radial vibration due to the eccentricity of the laundry in the inner drum, while reducing the vibration and noise, to achieve the purpose of vibration and noise reduction.

Further, in the washing machine of the present invention, a lower outer ring-shaped magnet and a lower inner ring-shaped magnet (i.e., a lower magnet pair) are respectively arranged on the upper surface of the bottom wall of the outer drum and the rotary shaft for driving the inner drum to rotate, so that when the radial vibration of the outer drum is generated due to the vibration of the inner drum, the magnetic force between the lower inner ring-shaped magnet and the lower outer ring-shaped magnet is used to buffer and balance the vibration of the outer drum, to reduce the magnitude of the radial vibration of the outer drum and to indirectly reduce the magnitude of the radial vibration of the inner drum, thereby further reducing the vibration and noise.

Further, in the washing machine of the present invention, the upper outer ring-shaped magnet and the lower outer ring-shaped magnet are arranged opposite each other, and an upper end face of the lower outer ring-shaped magnet has the same polarity as a lower end face of the upper outer ring-shaped magnet, so that the inner drum can be rotatably suspended inside the outer drum by means of the repulsion between the upper outer ring-shaped magnet and the lower outer ring-shaped magnet. In the washing machine of the present invention, since the upper outer ring-shaped magnet and the lower outer ring-shaped magnet are arranged on the lower surface of the bottom wall of the inner drum and the upper surface of the bottom wall of the outer drum, the inner drum can be rotatably supported in the outer drum, and the forces of gravity of the inner drum and the contents therein are directly applied to the bottom wall of the outer drum, thereby reducing the forces applied to the rotary bearing for connecting the inner drum and the rotating mechanism, which can prevent fatigue failure of the rotary bearing and prolong the service life of thereof so as to reduce the cost of the washing machine. At the same time, since the inner drum is supported in the outer drum in a suspended manner, the mechanical contact between the inner drum and the outer drum is reduced. When there is relative axial movement between the inner drum and the outer drum, the magnetic repulsion between the upper outer ring-shaped magnet and the lower outer ring-shaped magnet can function as a buffer, so as to weaken the vibration of the washing machine to a great extent during washing, dehydration and spin-drying, and to further reduce the noise.

The foregoing and other objects, advantages and features of the present invention will become more apparent to those skilled in the art from the following detailed description of specific embodiments of the invention taken in conjunction with the accompanying drawings.

BRIEF DESCRIPTION OF THE DRAWINGS

Some specific embodiments of the present invention will be described in detail by way of example only rather than by way of limitation with reference to the accompanying drawings. The same reference numerals in the accompanying drawings denote the same or similar components or parts. It should be understood by those skilled in the art that these drawings are not necessarily to scale. In the accompanying drawings.

DETAILED DESCRIPTION OF THE INVENTION

Figure 1:
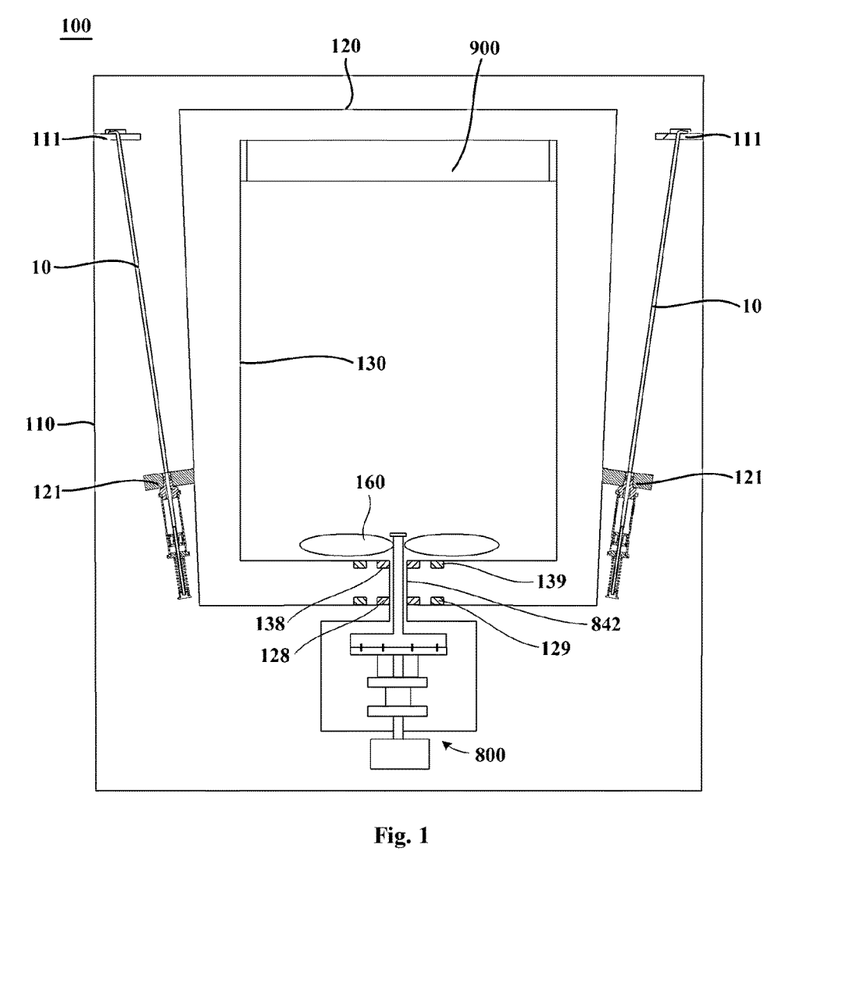
FIG. 1 is a schematic structural diagram of a washing machine according to an embodiment of the present invention.

FIG. 1 is a schematic structural diagram of a washing machine 100 according to an embodiment of the present invention. Referring to FIG. 1, the washing machine 100 may generally comprise a casing 110, an outer drum 120 arranged in the casing 110, an inner drum 130 rotatably arranged in the outer drum 120, and a rotating mechanism 800 for driving the inner drum 130 to rotate.

Figure 2:
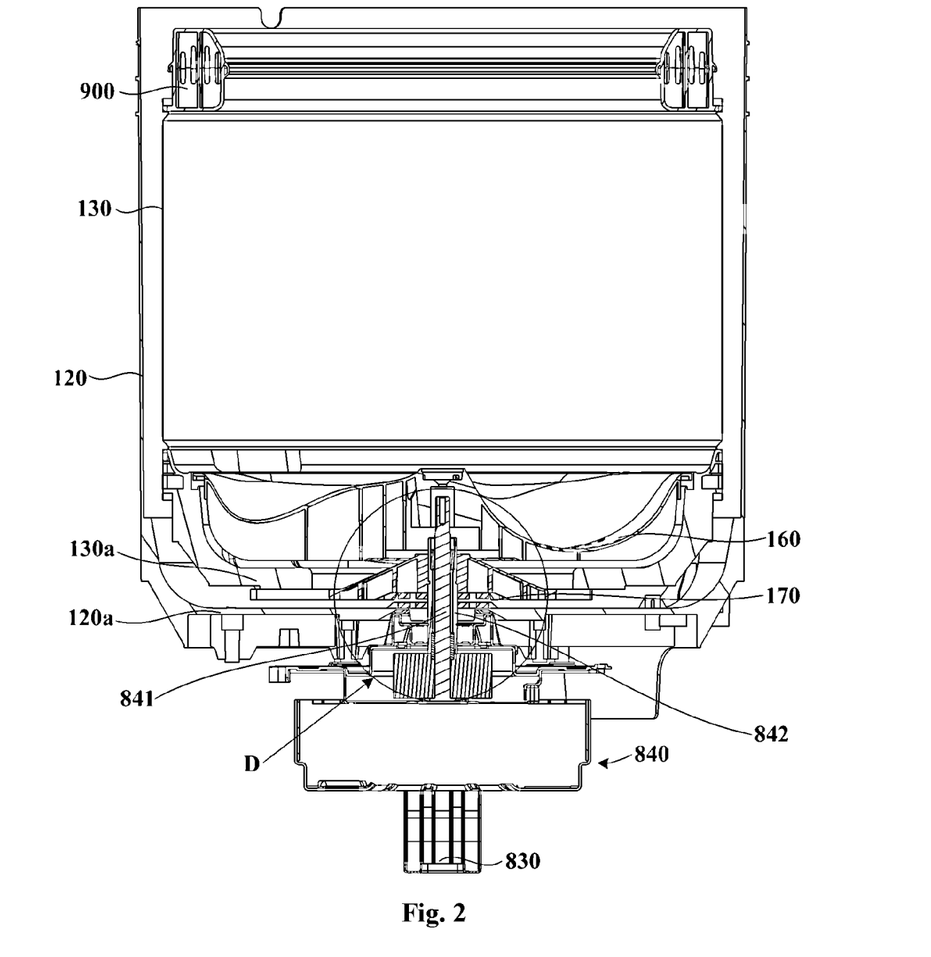
FIG. 2 is a schematic sectional diagram of a washing machine according to an embodiment of the present invention, in which a casing is omitted.
Figure 3:
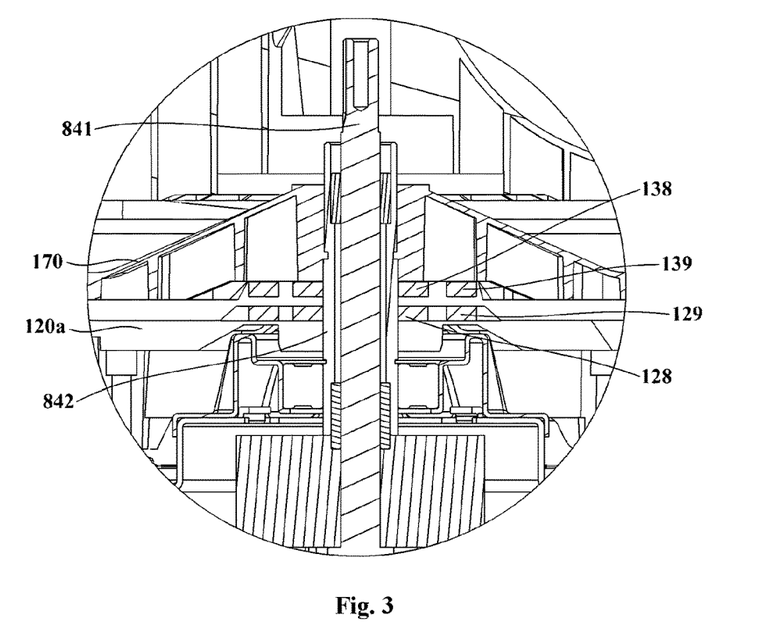
FIG. 3 is an enlarged schematic diagram of a region D shown in FIG. 2.

FIG. 2 is a schematic sectional diagram of a washing machine 100 according to an embodiment of the present invention, in which a casing 110 is omitted. FIG. 3 is an enlarged schematic diagram of a region D shown in FIG. 2. As shown in FIGS. 2 and 3, in some embodiments, the rotating mechanism 800 may comprise a driving motor 830 and a transmission mechanism 840 having a planetary gear and a sun gear. The driving motor 830 drives the inner drum 130 and a pulsator 160 to rotate in the same or opposite directions by means of the transmission mechanism 840. The rotating mechanism 800 is arranged below a bottom wall 120a of the outer drum 120, and a rotary shaft 842 of the rotating mechanism 800 extends from below the outer drum 120 upwardly to a bottom wall 130a of the inner drum 130 to drive the inner drum 130 to rotate. It is to be understood by those skilled in the art that the rotary shaft 842 can either directly drive the inner drum 130 to rotate, or indirectly drive the inner drum 130 to rotate via an intermediate part such as a flange plate 170 mentioned later. In a preferred embodiment of the present invention, a lower surface of the bottom wall 130a of the inner drum 130 is provided with a flange plate 170, and the rotary shaft 842 indirectly drives the inner drum 130 to rotate via the flange plate 170.

Figure 4:
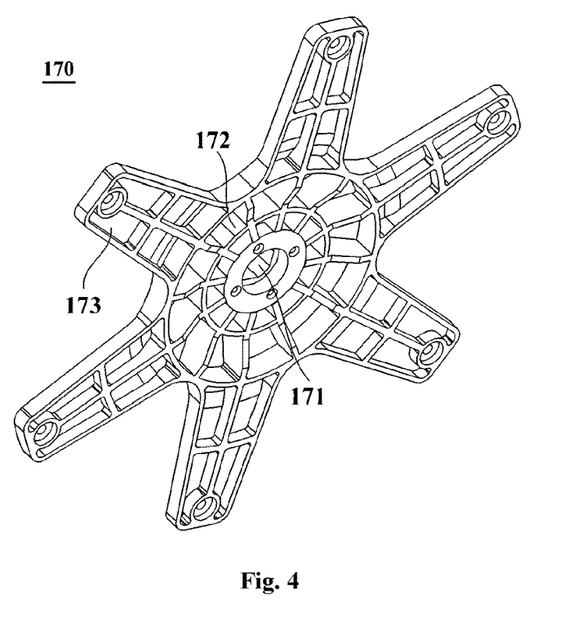
FIG. 4 is a schematic structural diagram of a flange plate in the washing machine shown in FIG. 3.

FIG. 4 is a schematic structural diagram of the flange plate 170 in the washing machine 100 shown in FIG. 3. The flange plate 170 comprises a flange plate body 172 which is provided with a through-hole 171 through which a rotary mandrel 841 can pass, and a plurality of mounting legs 173 protruding radially outward from the flange plate body 172. The rotary shaft 842 is connected to the flange plate 170 in a form-fitting manner, to drive the inner drum 130 to rotate via the flange plate 170. A screw hole is provided in the distal end of each mounting leg 173, so as to fix the flange plate 170 to the bottom wall 130a of the inner drum 130 via screws.

The rotary mandrel 841 of the rotating mechanism 800 may extend, inside the rotary shaft 842, from below the outer drum 120 into the inner drum 130, to drive the rotation of the pulsator 160 arranged in the inner drum 130. Between the rotary mandrel 841 and the rotary shaft 842, a sealing ring (not shown in figures) may be provided at the connection of the rotary shaft 842 and the bottom wall 120a of the outer drum.

In particular, in the present invention, the washing machine 100 further comprises at least one magnet pair. The magnet pair comprises an outer ring-shaped magnet and an inner ring-shaped magnet arranged opposite the outer ring-shaped magnet on a radially inner side thereof, wherein the inner ring-shaped magnet is arranged on the rotary shaft 842, and the outer ring-shaped magnet is arranged on the bottom wall 130a of the inner drum 130 or the bottom wall 120a of the outer drum 120, so as to reduce the magnitude of a radial vibration of the inner drum 130 and/or the outer drum 120 by means of a magnetic force between the inner ring-shaped magnet and the outer ring-shaped magnet.

When the existing washing machine performs dehydration at a high speed, the inner drum 130 and/or the outer drum 120 may be inclined undeterminably due to the eccentricity of the laundry, resulting in a collision between the inner drum 130 and the outer drum 120 or even between the outer drum 120 and the casing 110. In the washing machine 100 of the present invention, the at least one magnet pair is arranged between the bottom wall 130a of the inner drum and the bottom wall 120a of the outer drum, so that when the radial vibration of the inner drum 130 and/or the outer drum 120 is generated due to the eccentricity of the laundry in the inner drum, the magnetic force between the inner ring-shaped magnet and the outer ring-shaped magnet is used to buffer the radial vibration of the inner drum 130 and/or the outer drum 120 to reduce the magnitude of the radial vibration of the inner drum 130 and/or the outer drum 120, so as to effectively compensate for the radial vibration due to the eccentricity of the laundry in the inner drum 130, while reducing the vibration and noise, to achieve the purpose of vibration and noise reduction.

It is to be understood by those skilled in the art that when a plurality of magnet pairs are provided between the lower surface of the bottom wall 130a of the inner drum and the upper surface of the bottom wall 120a of the outer drum, the inner ring-shaped magnets of any one of the plurality of magnet pairs are all arranged on the rotary shaft 842; whereas the outer ring-shaped magnets of the plurality of magnet pairs are not necessarily all provided on the lower surface of the bottom wall 130a of the inner drum 130 or on the upper surface of the bottom wall 120a of the outer drum 120. For example, in the embodiment in which two magnet pairs are provided between the lower surface of the bottom wall 130a of the inner drum and the upper surface of the bottom wall 120a of the outer drum, when the outer ring-shaped magnet of one of the magnet pairs is arranged on the lower surface of the bottom wall 130a of the inner drum 130, the outer ring-shaped magnet of the other magnet pair may be arranged on the lower surface of the bottom wall 130a of the inner drum 130 or may be arranged on the upper surface of the bottom wall 120a of the outer drum 120.

In some embodiments, the inner ring-shaped magnet and the outer ring-shaped magnet of the magnet pair may be made of a permanent magnet material, and further preferably made of a neodymium-iron-boron magnetic material. In an alternative embodiment, at least one of the inner ring-shaped magnet and the outer ring-shaped magnet of the magnet pair may be an electromagnet. The electromagnet may comprise a core and an energizing coil wound around the core.

In some embodiments, the inner ring-shaped magnet and the outer ring-shaped magnet of the magnet pair are arranged substantially concentrically and are each arranged substantially concentric with the rotary shaft 842 of the rotating mechanism. It is to be understood by those skilled in the art that a substantially concentric arrangement can be understood to mean that the center of the inner ring-shaped magnet substantially coincides with the center of the upper outer ring-shaped magnet and substantially coincides with the axis of the rotary shaft 842.

Referring to FIGS. 1 to 3, in some embodiments, the aforementioned at least one magnet pair comprises an upper magnet pair. The upper magnet pair comprises an upper outer ring-shaped magnet 139 arranged on the lower surface of the bottom wall 130*a* of the inner drum 130 and an upper inner ring-shaped magnet 138 arranged on the rotary shaft 842, and the upper inner ring-shaped magnet 138 is arranged opposite the upper outer ring-shaped magnet 139 to reduce the magnitude of the radial vibration of the inner drum 130 by means of the magnetic force between the upper inner ring-shaped magnet 138 and the upper outer ring-shaped magnet 139.

The upper inner ring-shaped magnet 138 may be mounted or fixed on the rotary shaft 842 and is close to or adjacent to the lower surface of the bottom wall 130*a* of the inner drum 130, so as to be opposed to the upper outer ring-shaped magnet 139.

In some embodiments, the upper outer ring-shaped magnet 139 may be arranged on the flange plate 170, so as to be indirectly arranged on the lower surface of the bottom wall 130*a* of the inner drum 130. In a further embodiment, the upper inner ring-shaped magnet 138 and the upper outer ring-shaped magnet 139 are both permanent magnetic rings; and the upper outer ring-shaped magnet 139 is fixed to a lower surface of the flange plate 170 and surrounds the through-hole 171 of the flange plate 170.

In an alternative embodiment, the upper inner ring-shaped magnet 138 and the upper outer ring-shaped magnet 139 may both be discontinuous annular magnets, i.e., both the upper inner ring-shaped magnet 138 and the upper outer ring-shaped magnet 139 are composed of a plurality of magnetic blocks arranged at intervals on their own circumference.

In a preferred embodiment, an upper end face of the upper inner ring-shaped magnet 138 has the same polarity as an upper end face of the upper outer ring-shaped magnet 139, and a lower end face of the upper inner ring-shaped magnet 138 has the same polarity as the lower end face of the upper outer ring-shaped magnet 139, so as to reduce the magnitude of the radial vibration of the inner drum 130 by means of the magnetic repulsion between the upper inner ring-shaped magnet 138 and the upper outer ring-shaped magnet 139. It is to be understood by those skilled in the art that the same polarity means that both are N poles or both S poles.

For a pulsator washing machine, the radial vibration of the inner drum 130 and the outer drum 120 may occur due to the eccentricity of the laundry in the inner drum 130. When the inner drum 130 vibrates and shifts to one side (e.g., front, rear, left or right), the spacing between the upper outer ring-shaped magnet 139 and the upper inner ring-shaped magnet 138 on this side becomes smaller, as a result, the repulsion between the upper outer ring-shaped magnet 139 and the upper inner ring-shaped magnet 138 increases and the inner drum 130 is pushed in the opposite direction under the action of the repulsion to effectively compensate for the vibration occurred due to the eccentricity of the laundry in the inner drum 130, so that the magnitude of the vibration of the inner drum 130 is reduced and the radial vibration thereof is damped.

In a preferred embodiment, the upper inner ring-shaped magnet 138 and the upper outer ring-shaped magnet 139 are made of the same permanent magnetic material; the thicknesses of the upper inner ring-shaped magnet 138 and the upper outer ring-shaped magnet 139 are the same; and the upper inner ring-shaped magnet 138 and the upper outer ring-shaped magnet 139 are located at the same vertical height, to ensure that the upper inner ring-shaped magnet 138 and the upper outer ring-shaped magnet 139 are arranged strictly opposite each other, so as to make better use of the magnetic force therebetween to buffer the radial vibration of the inner drum 130 of the washing machine.

In some embodiments, the aforementioned at least one magnet pair further comprises a lower magnet pair. The lower magnet pair comprises a lower outer ring-shaped magnet 129 arranged on the upper surface of the bottom wall 120*a* of the outer drum 120, and a lower inner ring-shaped magnet 128 arranged on the rotary shaft 842. The lower inner ring-shaped magnet 128 is arranged opposite the lower outer ring-shaped magnet 129, so as to reduce the magnitude of the radial vibration of the outer drum 120 by means of a magnetic force between the lower inner ring-shaped magnet 128 and the lower outer ring-shaped magnet 129.

The lower inner ring-shaped magnet 128 may be mounted or fixed on the rotary shaft 842 and is close to or adjacent to the upper surface of the bottom wall 120*a* of the outer drum 120, so as to be opposed to the lower outer ring-shaped magnet 129.

In a further embodiment, the lower inner ring-shaped magnet 128 and the lower outer ring-shaped magnet 129 are both permanent magnetic rings; the lower outer ring-shaped magnet 129 is fixed to the upper surface of the bottom wall 120*a* of the outer drum 120 and surrounds a central axial hole of the bottom wall 120*a* of the outer drum.

In a preferred embodiment, an upper end face of the lower inner ring-shaped magnet 128 has the same polarity as the upper end face of the lower outer ring-shaped magnet 129, and a lower end face of the lower inner ring-shaped magnet 128 has the same polarity as a lower end face of the lower outer ring-shaped magnet 129, so as to reduce the magnitude of the radial vibration of the outer drum 120 by means of the magnetic repulsion between the lower inner ring-shaped magnet 128 and the lower outer ring-shaped magnet 129.

In a further embodiment, the lower inner ring-shaped magnet 128 and the lower outer ring-shaped magnet 129 are made of the same permanent magnetic material. The thicknesses of the lower inner ring-shaped magnet 128 and the lower outer ring-shaped magnet 129 are the same; and the lower inner ring-shaped magnet 128 and the lower outer ring-shaped magnet 129 are located at the same vertical height, to ensure that the lower inner ring-shaped magnet 128 and the lower outer ring-shaped magnet 129 are arranged strictly opposite each other, so as to make better use of the magnetic force therebetween to buffer the radial vibration of the outer drum 120 of the washing machine.

In a preferred embodiment of the present invention, the lower outer ring-shaped magnet 129 is arranged opposite the upper outer ring-shaped magnet 139, and two opposite surfaces of the lower outer ring-shaped magnet 129 and the upper outer ring-shaped magnet 139 have the same polarity, so as to support the inner drum 130 in the outer drum 120 by means of the magnetic repulsion between the lower outer ring-shaped magnet 129 and the upper outer ring-shaped magnet 139. It is easy to understand that the aforementioned "the lower outer ring-shaped magnet 129 is arranged opposite the upper outer ring-shaped magnet 139" means that the upper end face of the lower outer ring-shaped magnet 129 is arranged opposite the lower end face of the upper outer ring-shaped magnet 139, and this means that projections of the lower outer ring-shaped magnet 129 and the upper outer ring-shaped magnet 139 at least partially overlap with each other on the horizontal plane, such that there is a relatively large repulsion between the lower outer ring-shaped magnet 129 and the upper outer ring-shaped magnet 139 to support the inner drum 130 in a suspended manner.

That is to say, the upper outer ring-shaped magnet 139 is suspended over the lower outer ring-shaped magnet 129 by virtue of the magnetic repulsion between the upper outer ring-shaped magnet and the lower outer ring-shaped magnet 129. Under the action of the magnetic repulsion between the upper outer ring-shaped magnet 139 and the lower outer ring-shaped magnet 129, the upper outer ring-shaped magnet 139 can exert an upward supporting force on the inner drum 130 via the bottom wall 130a of the inner drum, so as to overcome the force of gravity of the inner drum 130 itself and the force of gravity of the contents therein to support the inner drum 130 in the outer drum 120 in a suspended manner, so that the inner drum 130 does not come into contact with the outer drum 120 when rotating and the mechanical friction between the inner drum 130 and the outer drum 120 is prevented, thereby having effective vibration and noise reduction effects. The force of gravity of the inner drum 130 itself and the force of gravity of the contents therein may act directly on the bottom wall 120a of the outer drum via the upper outer ring-shaped magnet 139 and the lower outer ring-shaped magnet 129. The above washing machine 100 may also be referred to as a magnetic suspension washing machine.

It is to be understood by those skilled in the art that the inner drum 130 is supported in the outer drum 120 by means of the magnetic repulsion between the lower outer ring-shaped magnet 129 and the upper outer ring-shaped magnet 139, and this equivalent to that an elastic apparatus is added between the inner drum 130 and the outer drum 120 to buffer the transmission of mechanical vibration between the inner and outer drums during the operation of the washing machine 100.

In the present invention, the upper inner ring-shaped magnet 138 and the lower inner ring-shaped magnet 128 are arranged on the rotary shaft 842, and the upper outer ring-shaped magnet 139 and the lower outer ring-shaped magnet 129 are respectively arranged on the lower surface of the bottom wall 130a of the inner drum and the upper surface of the bottom wall 120a of the outer drum, so as to reduce the magnitude of the radial vibration of the inner and outer drums by means of the magnetic forces between the upper inner ring-shaped magnet 138 and the upper outer ring-shaped magnet 139, and between the lower inner ring-shaped magnet 128 and the lower outer ring-shaped magnet 129; and the outer ring-shaped top magnet 139 and the lower outer ring-shaped magnet 129 are arranged opposite each other and the opposite end faces thereof have the same polarity, so as to provide a supporting force for the inner drum 130 by means of the repulsion between the two. In the present invention, the upper inner ring-shaped magnet 138, the lower inner ring-shaped magnet 128, the upper outer ring-shaped magnet 139 and the lower outer ring-shaped magnet 129 are combined to form an organic whole, so that both the buffering of the axial vibration and the restraining of the radial vibration can be achieved with an unexpected excellent damping effect.

In some embodiments, the lower inner ring-shaped magnet 128 and the lower outer ring-shaped magnet 129 are made of the same permanent magnet material as the upper inner ring-shaped magnet 138 and the upper outer ring-shaped magnet 139. Further, the projections of the lower outer ring-shaped magnet 129 and the upper outer ring-shaped magnet 139 substantially coincide with each other on the horizontal plane; that is to say, the inner diameter of the lower outer ring-shaped magnet 129 is substantially the same as the inner diameter of the upper outer ring-shaped magnet 139, the outer diameter of the lower outer ring-shaped magnet 129 is substantially the same as the outer diameter of the upper outer ring-shaped magnet 139, and the lower outer ring-shaped magnet 129 and the upper outer ring-shaped magnet 139 are arranged substantially coaxially, to ensure that the lower outer ring-shaped magnet 129 and the upper outer ring-shaped magnet 139 are arranged strictly opposite each other, so that the inner drum 130 can suspend more stably inside the outer drum 120.

In a further preferred embodiment, the spacing between the lower outer ring-shaped magnet 129 and the upper outer ring-shaped magnet 139 is about 1 cm to 2 cm, the repulsion between the lower outer ring-shaped magnet 129 and the upper outer ring-shaped magnet 139 is about 280 N to 350 N, and the repulsion selected from this range is enough to smoothly suspend the inner drum 130 full of clothes and water.

It is to be readily understood by those skilled in the art that in a preferred embodiment of the present invention, the washing machine 100 comprises both the upper magnet pair and the lower magnet pair. In an alternative embodiment, the washing machine 100 may comprise only the upper magnet pair or the lower magnet pair.

In addition, the inventors of the present invention have found that in a magnetic suspension washing machine in which the inner drum 130 is supported in the outer drum 120 only by means of the repulsion between two magnetic rings arranged opposite each other vertically (referred to simply as upper and lower magnets), since the inner drum 130 is suspended over the outer drum 120 by means of the repulsion between the upper and lower magnets, the inner drum 130 will lose radial restraints when rotating at a high speed, thereby prone to radial shaking. Therefore, one or two inner ring-shaped magnets arranged on the rotating shaft may be added to the magnetic suspension washing machine to form one or two magnetic ring pairs with the original upper and lower magnetic rings, to relieve the radial vibration of the inner drum and/or the outer drum.

Figure 5:
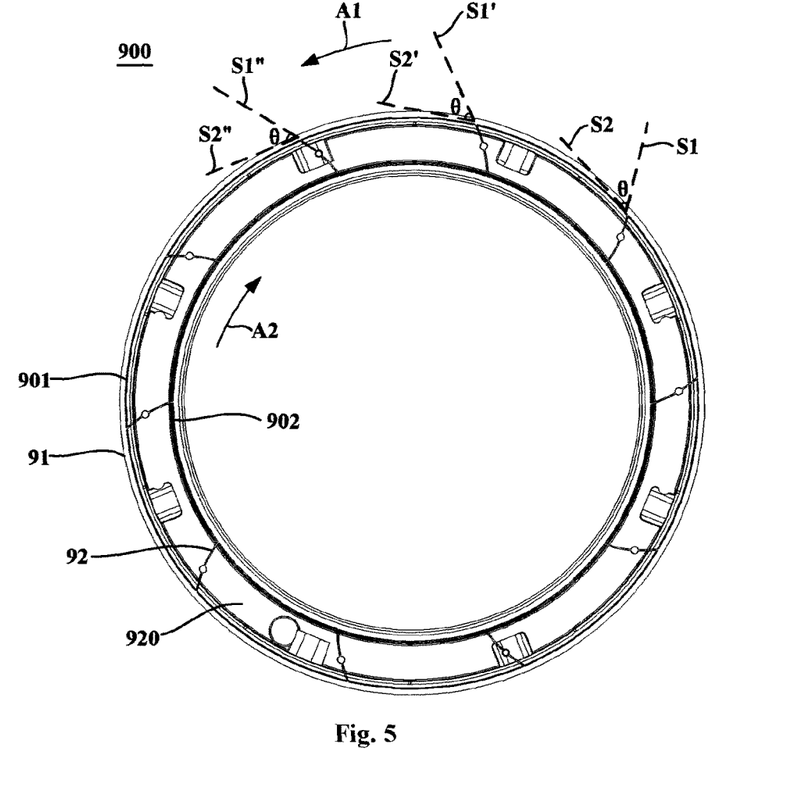
FIG. 5 is a schematic perspective diagram of a balancing ring in the washing machine shown in FIG. 1.

In some embodiments of the present invention, the washing machine 100 further comprises a balancing ring 900 arranged at the top of the inner drum 130. FIG. 5 is a schematic perspective diagram of the balancing ring 900 in the washing machine 100 shown in FIG. 1. As shown in FIG. 5, the balancing ring 900 comprises a housing 91 having an annular chamber 920 defined therein for receiving a balancing medium, and at least one arc-shaped baffle 92 arranged in the annular chamber 920. Each arc-shaped baffle 92 extends arcuately from an inner peripheral wall 902 of the annular chamber 920 to an outer peripheral wall 901 thereof, and each arc-shaped baffle 92 is provided with a fluid flow through-hole (not shown in the figures) allowing the balancing medium to flow in the annular chamber 920. The balancing medium may be saline, or other suitable fluid. Compared to the planar baffle, the arc-shaped baffle 92 of the present embodiment is advantageous for reducing the flow resistance of the balancing medium inside the balancing ring 900.

In particular, the included angle θ between the tangent line S1 of each arc-shaped baffle 92 at the outside end thereof in the extending direction thereof and the tangent line S2 of the outer peripheral wall 901 of the annular chamber 920 at the outside end in the rotation direction A1 is an acute angle. The rotation direction A1 is the rotation direction opposite to the rotation direction A2 of the inner drum 130 (or the balancing ring 900) when the washing machine 100 is in the spin-drying operation. The tangent line S1 of the arc-shaped baffle 92 at the outside end thereof in the extending direction thereof in the embodiment of the present invention may be understood as the tangent line extending along the extending direction of the arc-shaped baffle 92, that is, the tangent lines S1, S1', S1" in FIG. 5. The tangent line S2 of the outer peripheral wall 901 of the annular chamber 920 at the outside end in the rotational direction A1 may be understood as a tangent line of the outer circumferential wall 901 at the outside end thereof extending towards the rotation direction A1 with respect to the extending direction of the arc-shaped partition plate 92, or with respect to the tangent line of the arc-shaped baffle 92 at the outside end thereof in the extending direction thereof. In other words, the tangent line S2 is a section, facing the first rotational direction A1, of the tangent line of the outer circumferential wall 901 of the annular chamber 920 at the outside end thereof, i.e., the tangent lines S2, S2', S2" in FIG. 5.

This can reduce the flow resistance of the balancing medium inside the balancing ring 900 when the washing machine 100 performs the dehydration and spin-drying and shorten the time for the balancing medium in the annular chamber 920 to reach the outer peripheral wall 901 of the annular chamber 920. Consequently, the balancing medium rapidly converges to the opposite side of the eccentric force along the arc-shaped baffles 92 to achieve eccentric self-compensation, so as to quickly balance the eccentricity caused by the rotation of the inner drum 130.

In some embodiments of the present invention, a plurality of planar baffles (not shown in figures) are further arranged in an annular cavity 920 and spaced apart from the plurality of arc-shaped baffles 92.

In a further embodiment, the included angle θ between the tangent line S1 of each arc-shaped baffle 92 at the outside end thereof in the extending direction thereof and the tangent line S2 of the outer peripheral wall 901 of the annular chamber 920 at the outside end in the rotation direction A1 is 30-60°, which can further shorten the time for the balancing medium in the annular chamber 920 to reach the outer peripheral wall 901, so as to quickly balance the eccentricity caused by the rotation of the inner drum 130.

Further, the included angle between the tangent line of each arc-shaped baffle 92 at each point over its extension length in the extending direction thereof and the tangent line of a circumference, which passes through the point and is concentric with the inner peripheral wall 902 of the annular chamber 920 (in other words, a concentric circumference with the inner circumferential wall 902 of the annular chamber 920), at the point in the rotation direction A1 is an acute angle or 0° (in other words, the angle between the two is less than 90°). By means of this arrangement, when the balancing medium is rotated in the rotation direction A2, the resistance sustained by the balancing medium in the process of flowing from the inner peripheral wall 902 of the annular chamber 920 to the outer peripheral wall 901 may be small, and the time for reaching the outer peripheral wall 901 is therefore further shortened.

In a preferred embodiment, the number of arc-shaped baffles 92 in the balancing ring 900 is 8-12, preferably 10. In such an embodiment, the balancing ring 900 facilitates maintaining the balancing medium in the radially opposite position of the maximum eccentric portion during the rotation of the inner drum 130 in the dehydration and spin-drying stage of the washing machine 100, so that the eccentric vibration when rotating at a low speed can be effectively suppressed.

Tests have indicated that the balancing ring 900 of the present invention provides a balancing effect when the rotational speed of the inner drum 130 is relatively low compared to the balancing ring in the prior art in which only radial baffles are used. In other words, the balancing ring in the prior art can provide a balancing effect only when the rotation speed of the inner drum 130 reaches a certain rotation speed threshold. However, in the embodiment of the present invention, when the rotation speed of the inner drum 130 is within a certain rotational speed range lower than the aforementioned rotation speed threshold, the balancing ring 900 can provide a balancing effect, so that the washing machine 100 according to the embodiment of the present invention can have a smaller magnitude of vibration at the beginning of the dehydration and spin-drying operation of the inner drum 130 thereof.

Figure 6:
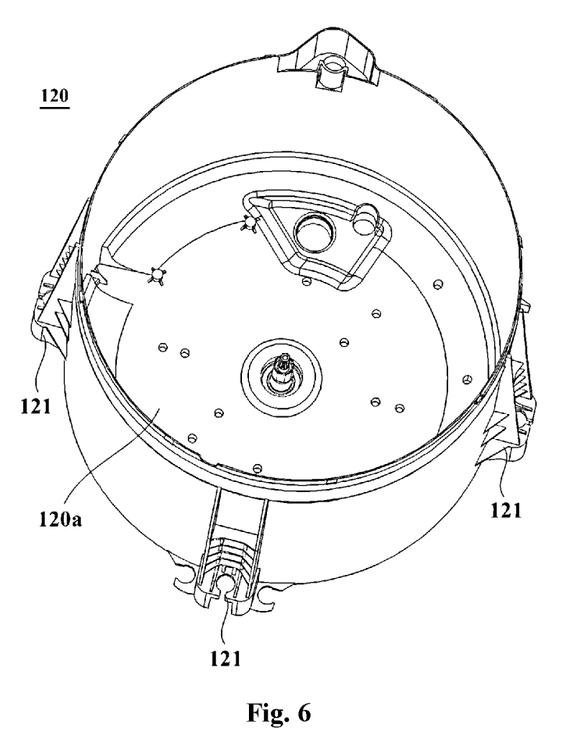
FIG. 6 is a schematic structural diagram of an outer drum in the washing machine shown in FIG. 1.

In a pulsator washing machine, the outer drum 120 is typically suspended in the casing 110 via a plurality of suspension rods. Referring to FIGS. 1 and 6, similar to the pulsator washing machine in the prior art, in the embodiment of the present invention, a plurality of suspending seats 111 are distributed on the circumferential inner wall of the casing 110, and a plurality of vibration-damping seats 121 are distributed on the lower part of the circumferential outer wall of the outer drum 120 for being respectively connected to the plurality of suspension rods. In general, the numbers of suspending seats 111 and vibration-damping seats 121 are each four, which are evenly distributed radially along the circumference of the outer drum 120, so that the four suspension rods are evenly stressed.

Figure 7:
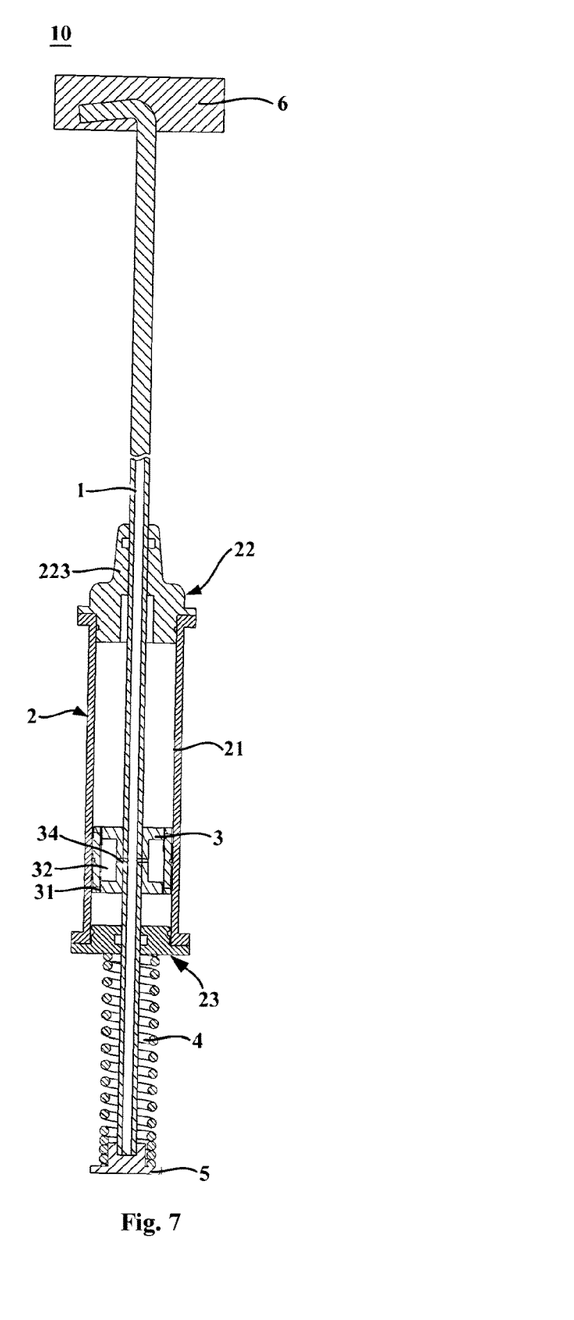
FIG. 7 is a schematic sectional diagram of a damping-adjustable suspension rod in the washing machine shown in FIG. 1.

In particular, the suspension rods in the embodiment of the present invention are preferably damping-adjustable suspension rods 10 that can adjust the magnitude of damping by changing the size of the magnetic field. FIG. 7 is a schematic sectional diagram of the damping-adjustable suspension rod 10 according to a preferred embodiment of the present invention. Referring to FIG. 7, the damping-adjustable suspension rod 10 may comprise a cylinder body 2, an elongated suspension rod 1 and a piston 3. A cavity is defined in the cylinder body 2 for containing a magneto-rheological fluid. The bottom end of the elongated suspension rod 1 is inserted into the cylinder body 2 from the upper end of the cylinder body 2 and protrudes outwardly through the lower end of the cylinder body 2. The elongated suspension rod 1 is reciprocable in the axial direction with respect to the cylinder body 2. The piston 3 is arranged in the cavity of the cylinder body 2 and fixedly fitted over the elongated suspension rod 1, and can reciprocate with the elongated suspension rod 1 in the axial direction in the cavity.

The piston 3 is provided with a coil 32 capable of generating a magnetic field when energized and a liquid flow passage 31 axially penetrating the piston 3. The piston 3 may be made of a ferromagnetic material, and the coil 32 is wound inside the piston 3. The magneto-rheological fluid on one side of the piston 3 may flow to the other side of the piston 3 via the liquid flow passage 31, so that the spaces, on the upper and lower sides, of the piston 3 are in communication with each other through the liquid flow passage 31. When the piston 3 moves upward in the cylinder body 2, the magneto-rheological fluid in the chamber flows downward from the top through the liquid flow passage 31; and when the piston 3 moves downward in the cylinder body 2, the magneto-rheological fluid flows upward from the bottom through the liquid flow passage 31. When the coil 32 is energized, a magnetic field is generated around it, and the viscosity of the magneto-rheological fluid in the liquid flow passage 31 is changed by the magnetic field. The fluidity of the magneto-rheological fluid in the liquid flow passage 31 can be changed by changing the magnitude of the current in the coil 32, so as to change the magnitude of the damping when the piston 3 moves. Therefore, it is possible to provide different viscous damping forces when the washing machine 100 work under different loads, so that the vibration of the low-speed resonance region can be quickly attenuated in the case of a large damping when the dehydration of the washing machine 100 starts at a large load; whereas in a high-speed dehydration stage with a light load, the vibration of the outer drum 120 in the case of a small damping is effectively isolated, so that the vibration is not transmitted to the casing 110 of the washing machine 100, thereby reducing the magnitude of vibration of the casing 110, to ensure that the washing machine 100 runs smoothly under various loads in the entire dehydration and spin-drying process.

A slot 34 is provided in the elongate suspension rod 1 and the piston 3 for arranging a wire for supplying power to the coil 32. The slot 34 extends from the piston 3 to the top end of the elongated suspension rod 1.

The top end of the elongated suspension rod 1 is provided with a top mounting seat 6 for suspending the damping-adjustable suspension rods 10 from the suspending seats 111 of the casing 110. The wire for supplying power to the coil 32 may be connected to a power source via the top mounting seat 6. The upper end of the cylinder body 2 is formed with an upward extending positioning portion 223 for cooperating with the shock-absorbing seat 121 of the outer drum 120 so that the outer drum 120 is suspended from the damping-adjustable suspension rods 10 under the action of the force of gravity. The structure of the top mounting seat 6 may be similar to an upper ball seat of the suspension rod in the prior art. The structure of the positioning portion 223 may be similar to a lower ball seat of the suspension rod in the prior art. The suspending seat 111 and the shock-absorbing seat 121 are respectively provided with a through-hole with a diameter larger than that of the elongate suspension rod 1, the elongate suspension rod 1 passes through the suspending seat and the shock-absorbing seat, and the top mounting seat 6 and the positioning portion 223 are respectively located outside the suspending seat 111 and the vibration-damping seat 121 so as to be respectively attached to the suspending seat 111 and the shock-absorbing seat 121 under the action of the force of gravity of the outer drum 120.

In some embodiments, the cylinder body 2 comprises a cylindrical jacket 21, and an upper cover 22 and a lower cover 23 located at the upper and lower ends of the cylindrical jacket 21 for sealing same. The positioning portion 223 is formed on the upper cover 22. The center of the upper end cover 22 has a through-hole to allow the elongated suspension rod 1 to pass therethrough and reciprocate in the axial direction with respect to the upper end cover 22.

In a further embodiment, the damping-adjustable suspension rod 10 further comprises a suspension rod seat 5 and a spring 4, wherein the suspension rod seat 5 is fixedly arranged at the bottom end of the elongated suspension rod 1; and the spring 4 is fitted over the elongated suspension rod 1 between the bottom end of the elongated suspension rod 1 and the lower end of the cylinder body 2 (in other words, the spring 4 is between the suspension rod seat 5 and the lower end of the cylinder body 2). When the elongated suspension rod 1 moves upward in the cylinder body 2, the spring 4 shortens; and when the elongated suspension rod 1 moves downward in the cylinder body 2, the spring 4 extends. The spring 4 facilitates the reciprocating motion of the elongated suspension rod 1 and may further have a damping function.

For the damping-adjustable suspension rod 10 according to the embodiment of the present invention, since the bottom end of the elongated suspension rod 1 thereof is inserted into the cylinder body 2 from the upper end of the cylinder body 2 and protrudes outwardly through the lower end of the cylinder body 2, the elongated suspension rod 1 can be better restrained by the upper and lower ends of the cylinder body 2. When the elongated suspension rod 1 drives the piston 3 to slide in the cylinder body 2, the movement direction of the elongated suspension rod 1 will not easily deviate, so that it is less likely to generate flexural deformation, and the piston 3 is less likely to be deviated from the cylinder. Therefore, the present invention can ensure that the damping-adjustable suspension rods 10 have a good damping effect, while having a longer service life, especially for the pulsator washing machine.

It is to be understood by those skilled in the art that the washing machine 100 according to the present invention comprises, but is not limited to, a washing device only having a washing and spin-drying function, and further comprises apparatuses having other functions, such as a washing and drying machine with a washing and spin-drying function and a drying function.

It is also to be understood by those skilled in the art that in the description of the present invention, the terms "upper", "lower", "top", "bottom", "vertical", "horizontal", etc. for indicating the orientation or positional relationships are based on the actual usage state of the washing machine 100, and these terms are merely for convenience in describing and understanding the technical solutions of the present invention, rather than indicating or implying that the apparatus or components referred to must have a particular orientation or be constructed and operated in a particular orientation, and therefore will not be interpreted as limiting the present invention.

At this point, those skilled in the art will recognize that, while numerous exemplary embodiments of the present invention have been shown and described in detail herein, many other variations or modifications that conform to the principles of the present invention may be determined or derived directly from the disclosure of the present invention without departing from the spirit and scope of the present invention. It therefore should be understood and determined that the scope of the present invention covers all such other modifications or modifications.

What is claimed is:

1. A washing machine comprising an outer drum, an inner drum rotatably arranged in the outer drum, and a rotating mechanism for driving the inner drum to rotate, a rotary shaft of the rotation mechanism extending from below the outer drum upward to a bottom wall of the inner drum to drive the inner drum to rotate;

the washing machine further comprising:

an upper magnet pair which comprises an upper outer ring-shaped magnet provided on a lower surface of the bottom wall of the inner drum, and an upper inner ring-shaped magnet arranged on the rotary shaft and opposite the upper outer ring-shaped magnet; and a lower magnet pair which comprises a lower outer ring-shaped magnet provided on an upper surface of the bottom wall of the outer drum, and a lower inner ring-shaped magnet arranged on the rotary shaft and opposite the lower outer ring-shaped magnet, wherein an upper end face of the upper inner ring-shaped magnet has the same polarity as an upper end face of the upper outer ring-shaped magnet, and a lower end face of the upper inner ring-shaped magnet has the same polarity as the lower end face of the upper outer ring-shaped magnet, so as to reduce the magnitude of the radial vibration of the inner drum by means of the magnetic repulsion between the upper inner ring-shaped magnet and the upper outer ring-shaped magnet; and an upper end face of the lower inner ring-shaped magnet has the same polarity as the upper end face of the lower outer ring-shaped magnet, and a lower end face of the lower inner ring-shaped magnet has the same polarity as a lower end face of the lower outer ring-shaped magnet, so as to reduce the magnitude of the radial vibration of the outer drum by means of the magnetic repulsion between the lower inner ring-shaped magnet and the lower outer ring-shaped magnet.

2. The washing machine according to claim 1, wherein the lower outer ring-shaped magnet is arranged opposite the upper outer ring-shaped magnet, an upper end face of the lower outer ring-shaped magnet has the same polarity as a lower end face of the upper outer ring-shaped magnet, so as to support the inner drum in the outer drum by means of the magnetic repulsion between the lower outer ring-shaped magnet and the upper outer ring-shaped magnet.

3. The washing machine according to claim 1, wherein the upper inner ring-shaped magnet and the upper outer ring-shaped magnet are both permanent magnetic rings; and a flange plate is arranged on the lower surface of the bottom wall of the inner drum, the flange plate has a through-hole through which the rotary shaft can pass, and the rotary shaft is connected to the flange plate in a form-fitting manner, to drive the rotation of the inner drum via the flange plate; and wherein the upper outer ring-shaped magnet is fixed to a lower surface of the flange plate and surrounds the through-hole of the flange plate.

4. The washing machine according to claim 1, wherein the lower inner ring-shaped magnet and the lower outer ring-shaped magnet are both permanent magnetic rings; and the lower outer ring-shaped magnet is fixed to the upper surface of the bottom wall of the outer drum and surrounds a central axial hole of the bottom wall of the outer drum.

5. The washing machine according to claim 1, wherein the lower inner ring-shaped magnet and the lower outer ring-shaped magnet are made of the same magnet material as the upper inner ring-shaped magnet and the upper outer ring-shaped magnet;

the upper inner ring-shaped magnet and the upper outer ring-shaped magnet have the same thickness;

the upper inner ring-shaped magnet and the upper outer ring-shaped magnet are located at the same vertical height;

the lower inner ring-shaped magnet and the lower outer ring-shaped magnet have the same thickness;

the lower inner ring-shaped magnet and the lower outer ring-shaped magnet are located at the same vertical height; and projections of the lower outer ring-shaped magnet and the upper outer ring-shaped magnet coincide with each other on a horizontal plane.

6. The washing machine according to claim 1, further comprising: a casing and a plurality of damping-adjustable suspension rods for suspending the outer drum in the casing, wherein each of the damping-adjustable suspension rods comprises:

a cylinder body having a cavity defined therein for containing a magneto-rheological fluid;

an elongated suspension rod, the top end of which is provided with a top mounting seat for suspending the damping-adjustable suspension rods from a suspending seat of the casing, and the bottom end of which is inserted into the cylinder body from the upper end of the cylinder body and protrudes outwardly through the lower end of the cylinder body;

a piston fixedly fitted over the elongated suspension rod which is located in the cavity, the piston being provided with a coil for generating a magnetic field and a liquid flow passage penetrating the piston in an axial direction for circulating the magneto-rheological fluid, and a spring fitted over the elongated suspension rod between the bottom end of the elongated suspension rod and the lower end of the cylinder body, wherein the upper end of the cylinder body is formed with an upward extending positioning portion for cooperating with a shock-absorbing seat of the outer drum so that the outer drum is suspended from the damping-adjustable suspension rods under the action of the force of gravity.

* * * * *